United States Patent
Lacaze et al.

(10) Patent No.: US 11,340,618 B2
(45) Date of Patent: May 24, 2022

(54) DRONE BASED INSPECTION SYSTEM AT RAILROAD CROSSINGS

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 237 days.

(21) Appl. No.: 16/535,455

(22) Filed: Aug. 8, 2019

(65) Prior Publication Data

US 2021/0041877 A1 Feb. 11, 2021

(51) Int. Cl.
| | |
|---|---|
| *G05D 1/02* | (2020.01) |
| *G05D 1/10* | (2006.01) |
| *G06F 16/29* | (2019.01) |
| *B64C 39/02* | (2006.01) |
| *G06V 20/20* | (2022.01) |
| *G06V 20/56* | (2022.01) |

(52) U.S. Cl.
CPC ......... *G05D 1/0214* (2013.01); *B64C 39/024* (2013.01); *G05D 1/106* (2019.05); *G06F 16/29* (2019.01); *G06V 20/20* (2022.01); *G06V 20/56* (2022.01); *B64C 2201/123* (2013.01); *G05D 2201/0207* (2013.01)

(58) Field of Classification Search
CPC .............. G05D 1/0214; G05D 1/106; G05D 2201/0207; G06F 16/29; B64C 39/024; B64C 2201/123; G06K 9/00671; G06K 9/00791
See application file for complete search history.

(56) References Cited

U.S. PATENT DOCUMENTS

| | | | |
|---|---|---|---|
| 2,702,171 | A | 2/1955 | Katzenberger |
| 3,053,480 | A | 9/1962 | Vanderlip |
| 3,306,250 | A | 2/1967 | Pitchford |
| 5,735,492 | A | 4/1998 | Pace |

(Continued)

FOREIGN PATENT DOCUMENTS

| | | |
|---|---|---|
| CN | 101179710 | 11/2007 |
| CN | 102050167 | 9/2010 |

(Continued)

OTHER PUBLICATIONS

Office Action for U.S. Appl. No. 15/794,931 dated Oct. 3, 2019; 38 pps.

(Continued)

*Primary Examiner* — Michael D Lang
(74) *Attorney, Agent, or Firm* — RowanTree Law Group, PLLC; Carson C. K. Fincham

(57) ABSTRACT

In the present invention, a transformable robot has been developed that can both drive and fly in the air to detect the different safety conditions and is referred to as a hybrid UAV/UGV. The invention relates to a transformable robot capable of flying and driving for survey of humps, visual sight lines, gates, lights, grades, rail deformations, culverts, drainage pipes, or signs at railroad crossings that comprise a ground locomotion system, an air locomotion system, controls, and a sensor that is necessary to do the survey of the different safety related conditions.

13 Claims, 8 Drawing Sheets

(56) References Cited

U.S. PATENT DOCUMENTS

| | | | |
|---|---|---|---|
| 5,825,412 | A | 10/1998 | Hobson |
| 7,069,124 | B1 | 6/2006 | Whittaker et al. |
| 7,164,975 | B2 | 1/2007 | Bidaud |
| 7,398,946 | B1 | 7/2008 | Marshall |
| 7,769,544 | B2 | 8/2010 | Blesener |
| 7,959,104 | B2 | 6/2011 | Kuntz |
| 8,167,234 | B1 | 5/2012 | Moore |
| 8,342,440 | B2 | 1/2013 | Papanikolopoulos |
| 8,639,400 | B1 | 1/2014 | Wong |
| 8,827,200 | B2 | 9/2014 | Radu |
| 8,991,740 | B2 | 3/2015 | Olm et al. |
| 9,108,479 | B1 | 8/2015 | Calvert |
| 9,145,207 | B2 | 9/2015 | Moschetta |
| 9,216,745 | B2 | 12/2015 | Beardsley et al. |
| 9,447,448 | B1 | 9/2016 | Kozloski |
| 9,550,400 | B2 | 1/2017 | Hutson |
| 9,611,038 | B2 | 4/2017 | Dahlstrom |
| 9,770,703 | B1 | 9/2017 | Soliz |
| 9,928,749 | B2 | 3/2018 | Gil |
| 9,963,230 | B2 | 5/2018 | Borman |
| 10,126,126 | B2 | 11/2018 | Clark |
| 10,540,901 | B2 | 1/2020 | Clark |
| 10,730,626 | B2 | 8/2020 | Gil |
| 10,775,792 | B2 | 9/2020 | Cooper |
| 10,872,534 | B2 | 12/2020 | Clark |
| 2002/0060267 | A1 | 5/2002 | Yavnai |
| 2004/0012491 | A1 | 1/2004 | Kulesz |
| 2005/0003715 | A1 | 1/2005 | Hewitt |
| 2005/0004723 | A1 | 1/2005 | Duggan et al. |
| 2005/0027412 | A1 | 2/2005 | Hobson |
| 2006/0187017 | A1 | 8/2006 | Kulesz |
| 2006/0190134 | A1 | 8/2006 | Ziegler |
| 2007/0228214 | A1 | 10/2007 | Horak |
| 2008/0048065 | A1 | 2/2008 | Kuntz |
| 2008/0311894 | A1 | 12/2008 | Klein |
| 2009/0228355 | A1 | 9/2009 | Dawson |
| 2010/0193626 | A1 | 8/2010 | Goossen |
| 2011/0061951 | A1 | 3/2011 | Gal |
| 2011/0226898 | A1 | 9/2011 | Smith |
| 2012/0185129 | A1 | 7/2012 | Carrier |
| 2012/0214550 | A1 | 8/2012 | Galaro |
| 2013/0062153 | A1 | 3/2013 | Ben-Tzvi et al. |
| 2014/0034775 | A1 | 2/2014 | Hutson |
| 2014/0034776 | A1 | 2/2014 | Hutson |
| 2014/0131507 | A1 | 5/2014 | Kalantari |
| 2014/0252166 | A1 | 9/2014 | Smith |
| 2014/0303814 | A1 | 10/2014 | Burema |
| 2015/0014475 | A1 | 1/2015 | Taylor |
| 2015/0136902 | A1 | 5/2015 | Green |
| 2015/0274294 | A1 | 10/2015 | Dahlstrom |
| 2016/0023755 | A1 | 1/2016 | Elshafei et al. |
| 2016/0114887 | A1 | 4/2016 | Zhou |
| 2016/0130000 | A1 | 5/2016 | Rimanelli |
| 2016/0144358 | A1 | 5/2016 | Patel |
| 2016/0207637 | A1 | 7/2016 | Campillo |
| 2016/0368549 | A1 | 12/2016 | Davis |
| 2017/0113797 | A1 | 4/2017 | Hogan |
| 2017/0144771 | A1 | 5/2017 | Lukaczyk |
| 2017/0199979 | A1 | 7/2017 | Reiner |
| 2017/0217588 | A1* | 8/2017 | Spinelli ............... G08G 5/0069 |
| 2017/0225802 | A1 | 8/2017 | Lussier |
| 2017/0234834 | A1 | 8/2017 | Briglin |
| 2018/0044000 | A1 | 2/2018 | Venturelli et al. |
| 2018/0074488 | A1 | 3/2018 | Cantrell |
| 2018/0079268 | A1 | 3/2018 | Sato |
| 2018/0173245 | A1 | 6/2018 | Twining |
| 2018/0180564 | A1 | 6/2018 | Farhart |
| 2019/0009756 | A1 | 1/2019 | Jacobs |
| 2019/0055018 | A1 | 2/2019 | Bei |
| 2019/0174208 | A1 | 6/2019 | Speicher |
| 2020/0406773 | A1 | 12/2020 | Lacaze |

FOREIGN PATENT DOCUMENTS

| | | |
|---|---|---|
| EP | 3459831 | 11/2017 |
| FR | 2587909 | 9/1986 |
| FR | 3036379 | 11/2016 |
| RU | 2166427 | 9/2000 |

OTHER PUBLICATIONS

Final Office Action for U.S. Appl. No. 15/794,931 dated Mar. 5, 2020; 24 pps.

Office Action for U.S. Appl. No. 15/794,931 dated Jul. 24, 2020; 31 pps.

Wikipedia, "Unmanned Aerial Vehicle", https://en.wikipedia.org/wiki/Unmanned_aerial_vehicle; archived by Internet Archive on Feb. 4, 2016; https://web.archive.org/web/20160204212920/https://en.wikipedia.org/wiki/Unmanned_aerial_vehicle#Autonomy; accessed Sep. 30, 2019 (Year: 2016) (Year: 2016).

Tom Spendlove, "B-Unstoppable, the Tank Drone Hybrid", engineering.com, posted Jun. 18, 2015; https://www.engineering.com/ PLMERP/ArticleID/10288/B-Unstoppable-the-Tank-Drone-Hybrid.aspx, accessed Sep. 20, 2019.

Kashmir Hill, "Joggobot, The Companion Drone That Makes You Run Faster, Longer, Harder", Forbes.com, Jun. 7, 2012; accessed from https://www.forbes.com/sites/kashmirhill/2012/06/07/joggobot-the-companion-drone-that-makes-you-run-faster-longer-harder/#34124f3d39e5; accessed on Sep. 30, 2019 (Year: 2012).

AAM, "Aerial Survey & LiDAR", http://www.aamgroup.com/services-and-technology/aerial-survey; archived by Internet Archive on Mar. 7, 2016; https://web.archive.org/web/20160307161714/http://www.aamgroup.com/services-and-technology/aerial-survey; accessed Sep. 30, 2019 (Year: 2016).

Office Action for U.S. Appl. No. 15/794,944 dated Oct. 3, 2019; 37 pps.

Final Office Action for U.S. Appl. No. 15/794,944 dated Mar. 5, 2020; 28 pps.

Office Action for U.S. Appl. No. 15/794,944 dated Aug. 6, 2020; 32 pps.

Notice of Allowance for U.S. Appl. No. 15/794,944 dated Mar. 24, 2021; 9 pps.

Office Action for U.S. Appl. No. 15/908,376 dated Aug. 30, 2018; 10 pps.

Final Office Action for U.S. Appl. No. 15/908,376 dated Mar. 11, 2019; 10 pps.

McCloud, "Belts and Pulleys", Jun. 14, 2014; 7 pps.

Office Action for U.S. Appl. No. 16/566,788 dated Oct. 10, 2019; 9 pps.

Final Office Action for U.S. Appl. No. 16/566,788 dated Feb. 25, 2020; 9 pps.

X-Carcopter, Expendables 3 drone'), 2013, (https://www.youtube.com/watch?v=4mdxgZM4y-M); 6 pps.

Office Action for U.S. Appl. No. 14/928,648 dated Feb. 22, 2017; 17 pps.

Final Office Action for U.S. Appl. No. 14/928,648 dated Aug. 30, 2017; 11 pps.

Office Action for U.S. Appl. No. 16/566,788 dated Aug. 2, 2021; 10 pps.

Office Action for U.S. Appl. No. 16/547,977 dated Feb. 17, 2021; 8 pps.

Notice of Allowance or U.S. Appl. No. 16/547,977 dated Jun. 11, 2021; 9 pps.

Notice of Allowance for U.S. Appl. No. 16/566,788 dated Feb. 9, 2022; 4 pps.

* cited by examiner

DRONE BASED INSPECTION SYSTEM AT RAILROAD CROSSINGS

CROSS-REFERENCES TO RELATED APPLICATIONS

Not Applicable.

BACKGROUND OF THE INVENTION

1. Field of the Invention

There are thousands of railway crossings across the United States and many of them have humped geometrical profiles that pose major risks to motor vehicles such as cars, buses, and trucks crossing the railroad tracks. A substantial amount of the railway crossing accidents are due to the low ground clearance across the humped railroad crossing. When a long-wheelbase or low-ground-clearance vehicle negotiates a high-profile roadway, such as a highway-railroad grade crossing, roadway crown, or driveway entrance, the vehicle may become lodged or stuck on the "hump". One example in which this occurs is when a railroad track is on an embankment and a low-ground-clearance vehicle on the crossing roadway becomes lodged on the track and is subsequently struck by a train. There is a need to be able to safely detect these humped profiles on the railroad crossings. As a result, there is a need to develop a drone-based grade crossing inspection system to improve the efficiency of grade crossing inspections for humped conditions and other safety-related conditions such as visual sight lines, location of gates, lights, signage, and other conditions. The drone that is used must be able to navigate both in the ground as well as in the air since it is necessary to be able to drive to detect the humped conditions and the visual sight lines while it is necessary to be able to fly in the air to detect the lights, signs, and gates. The hybrid unmanned aerial vehicle/unmanned ground vehicle (UAV/UGV platform is used in order to achieve these goals. Full functionality of the hybrid UAV/UGV platform has been demonstrated in both the ground and fly in the air mode for surveying many types of safety-related conditions at railroad crossings.

2. Description of Related Art

The statements in this section merely provide background information related to the present disclosure and may not constitute prior art.

Railroad crossing warning systems are perhaps the most familiar of a variety of vehicle collision/crossing warning systems. The purpose of Such warning systems is to notify vehicles and/or stationery warning indicators of the approach and/or proximity of a vehicle. Other examples of such warning systems include emergency vehicle traffic light override systems, automobile navigation systems, airport and construction zone vehicle tracking systems and other navigational control and warning systems.

Track geometry systems determine and record geometric parameters of railroad tracks used by vehicles such as railroad cars and locomotives and generate an inspection or work notice for a section of track if the parameters are outside a predetermined range. Each vehicle includes a body secured to a truck, which rides on the track. Conventional systems use a combination of inertial and contact sensors to indirectly measure and quantify the geometry of the track. More specifically, an inertial system mounted on the truck senses motion of the truck in relation to the track. A plurality of transducers measure relative motion of the truck in relation to the track.

There have been no reports in the patent literature on the use of unmanned aerial vehicles/unmanned ground vehicles (UAVs/UGVs) for the survey of a variety of safety related items in railroad crossings such as humps, visual sight lines, signs, lights, culverts, rail deformations, grade crossings, drainage pipes, and gates.

There has been a patent in the literature which deals with geometric tracks and track/vehicle analyzers and methods for controlling railroad systems. These are used for determining geometric parameters of tracks, determining the relation of tracks to vehicles and trains, analyzing the parameters in real-time and communicating corrective measures to various control mechanisms. This invention is discussed in U.S. Pat. No. 7,164,975.

There has been a railroad crossing traffic warning system that has been developed for alerting a motorist approaching a railroad crossing to the presence of an oncoming train. The system comprises a series of magnetometer sensor probes buried in the right-of-way adjacent to a railroad track at predetermined distances from the railroad crossing. It involves an X-shaped railroad warning crossing sign or "crossbuck" having light emitting diodes (LEDs) mounted across the center, several strobe lights, and a train direction indicator with several lamps that are lighted sequentially to indicate the direction that the oncoming train is travelling. It can be charged with a rechargeable battery using a solar panel array and is especially useful in rural areas where AC power is not readily available. This invention is discussed in U.S. Pat. No. 5,735,492.

There has been an intelligent video monitoring apparatus of the railway crossing that consists of a video sensor arranged on the railroad crossing and being capable of covering the traffic condition of the entire crossing as well as a monitoring computer used to monitor the condition of the entire crossing and capable of dynamic image understanding. It has the capability to automatically judge dangerous conditions or failures of the crossings through the image understanding technique and can communicate between the train driver and safety condition of the crossing as well as the passengers and vehicles passing through the crossing. This invention is discussed in CN101179710. There has been another video detection apparatus developed that has been used as a warning system as discussed in U.S. Pat. No. 5,825,412.

There have also been many other railroad crossing warning systems that have been developed such as those described in U.S. Pat. Nos. 5,735,492, 7,769,544, and several similar types of patents. However, these do not use the combination of hybrid unmanned aerial vehicles/unmanned ground vehicles for surveying various safety-related objects and conditions present at railroad crossings.

There have been no reports in the literature on the use of hybrid unmanned aerial vehicle/unmanned ground vehicle (UAV/UGV) for the detection of humps, visual sight lines, rail deformations, culverts, drainage pipes, lights, signs, and gates at railroad crossings.

SUMMARY OF THE INVENTION

A hybrid unmanned aerial vehicle/unmanned ground vehicle (UAV/UGV) has been developed for detecting humps, visual sight lines, rail deformations, culverts, drainage pipes, lights, signs, and gates at railroad crossings.

The hybrid UAV/UGV uses its drive mode to be able to survey the humps, the visual sight lines, rail deformations, and grade crossings that are present in the railroad crossings.

The hybrid UAV/UGV uses its flight mode to be able to survey the lights, signs, culverts, drainage pipes, and gates at railroad crossings.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

DETAILED DESCRIPTION OF THE INVENTION

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

Figure 1:
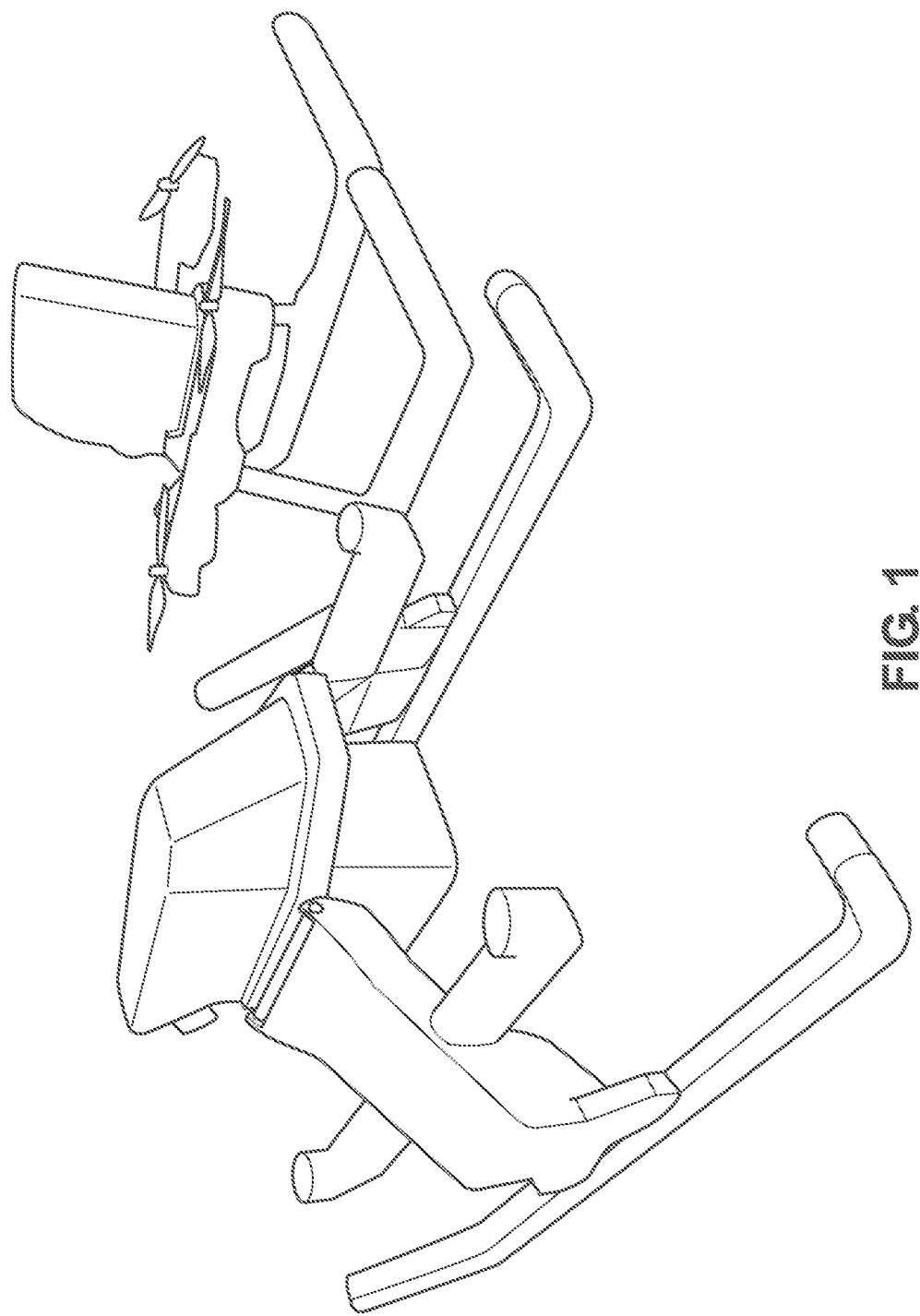
FIG. 1—A photograph of the hybrid UAV/UGV that is used for surveying humps, visual sight lines, lights, signs, culverts, drainage pipes, rail deformations, grade crossings, and gates at railroad crossings.
Figure 2:
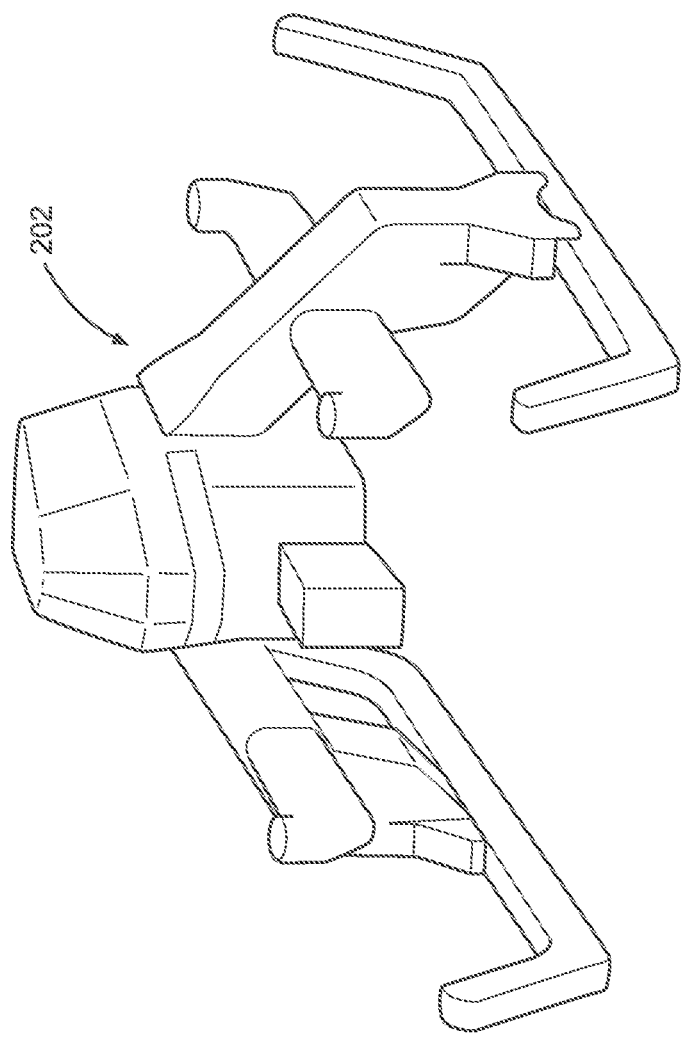
FIG. 2—Schematic of the hybrid UAV/UGV in the ground mode and in the flight mode as well as a CAD drawing of the hybrid UAV/UGV.
Figure 2:
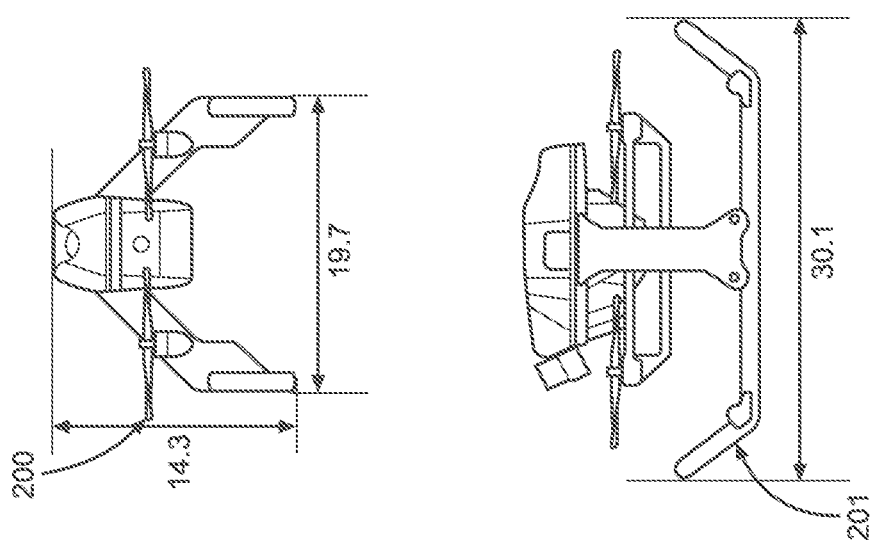

This invention describes the use of a hybrid unmanned aerial vehicle/unmanned ground vehicle (UAV/UGV) for surveying a variety of safety-related conditions in railroad crossings such as humps, visual sight lines, lights, signs, culverts, drainage pipes, grade crossings, rail deformations, and gates. FIG. 1 shows a photograph of the hybrid UAV/UGV system that is used for the surveying the different safety-related conditions in railroad crossings. FIG. 2 illustrates schematics of the hybrid UAV/UGV in the two different modes (ground mode (201) and fly in the air mode (200)) as well as a CAD drawing of the hybrid UAV/UGV system.

This hybrid system is a tactically deployable transformable robotic system that provides all the air capability of a Vertical Take-off and Landing Unmanned Aerial System (VTOL UAS), in conjunction with the capabilities of a tracked Unmanned Ground Vehicle (UGV). The hybrid system provides all this functionality in a single device which reduces weight, cost, and operator training. A single platform can perform air, ground, or hybrid missions that require both capabilities (go over the wall and drive indoors, perch and stare, etc.).

Perch and stare is a robotic maneuver where a vehicle flies to an overhead vantage point such as rooftops and windowsills to provide a user with improved tactical information. This may include landing on rooftops, flying from rooftop to rooftop, or to windowsills all while carrying cameras or other intelligence gathering sensors. Miniature rotorcraft such as the hybrid UAV/UGV described in this invention are ideal surveillance platforms, especially for perch and stare maneuvers because of their unique ability to take off and land vertically. Minimal vehicle size and weight also greatly enhance portability which is also a characteristic of the hybrid UAV/UGV system described in the present invention.

The hybrid functionality allows extended duration missions (perch and stare). These capabilities make them suitable for surveying humped conditions, visual sight lines, culverts, drainage pipes, rail deformations, and grade crossings as well as other important safety-related conditions such as surveying lights, signs, and gates.

Overall, it has a drive time of up to six hours and a flight time of 20 minutes without payload. Its weight is 10.6 pounds without batteries and no payload while it is 16.1 pounds with batteries and no payload. The payload capacity is 4.0 pounds and the maximum speed of the drone is 52 miles per hour, which is the current top measured speed. Four different types of payloads are available to use in the hybrid UAV/UGV. The payloads include 3D LIDAR, Tactical Mesh Radio, Auxiliary Computer, and EO/IR Gimbal Camera.

The base hybrid UAV/UGV platform used for this effort includes an encrypted radio, batteries, Take-off Altimeter, 1 forward pointing EO camera, 1 backward pointing EO camera, 1 downward pointing EO camera, 9-DOF IMU, GPS sensor, NVIDIA Jetson TX2 Processor, E-Stop ("kill" button for emergency power-down on both the Operator Control Unit and the hybrid UAV/UGV itself), a spinning LADAR (for mapping and added obstacle avoidance capability), and a modular payload bay.

The flight mode capabilities include air autonomy, teleoperation, altitude hold, altitude hold mode, and position hold mode. The ground mode capabilities include teleoperation and ground autonomy. The base platform operates in both GPS-enabled and GPS-denied environments.

The hybrid UAV/UGV lifts its tracks to provide for propeller protection and these same tracks provide robust ground performance. The hybrid UAV/UGV can use its propellers to aid the ground mode and its varying center of gravity improves flight in wind while accommodating different sized payloads.

By utilizing a hybrid UAS/UGV that transforms from flying to driving, the overall mission operation timeline can be extended significantly (from 30-45 minutes to hours). In addition, the sequential use of flying and driving (with driving being more energy efficient) enables the operator to get to more locations or closer to certain locations (with longer dwell times) for detection or sensing roadway challenges or objects of interest. The hybrid UAV/UGV can also be transported to an area of interest carried by operators or on a manned vehicle with a launch pad for the Pegasus it is carrying.

Pegasus systems use ATAK (Android Tactical Assault Kit) as the graphic user interface and there is also a NettWarrior version available. Both systems operate on a portable, ruggedized, and user-friendly small Robotic Research Operator Control Unit (OCU) and on an Android phone or tablet.

The new OCU controller has two joysticks, one d-pad, five buttons, two trigger buttons, two analog triggers, two dead man triggers, and three three-state switches. The controller attaches to a smartphone via the same connector that the cases use. The controller hooks into a radio like the MPU5 via power (provided by the radio) and ethernet. The design philosophy of the controller had three overarching principles. These principles drove all other development. The development team didn't see any single principle as more important than the others.

The controller is designed to minimize assembly time and use inexpensive components that are still reliable. Finally, the shell of the controller is designed to be injection molded. The controller has been successfully tested with the hybrid UAV/UGV.

The base OCU unit to be used for this effort includes: an encrypted commercial DDL radio or MPU5 radio, commercial rechargeable or disposable (CR123) batteries. The base OCU also has an Android Operating System; ATAK-based user interface that displays position location of platforms; displays video from EO or IR cameras; displays 2D LADAR maps from the Spinning Hokuyo Mapping Sensor; displays the health and status of the OCU and hybrid UAV/UGV platform (including payload); and displays the radiological information from the SRM radiological sensor. The OCU and/or the hybrid UAV/UGV can store information collected for the operator or transmit the geo-referenced radiological detection information, visual imagery, LADAR information, and flight information to a designated reach back center.

The hybrid UAV/UGV is a unique platform utilized both as a ground and an air platform (UGV and UAV). The platform already has hinges on its body which easily allows it to transform from a UGV to a UAV. This same hinge mechanism will allow the body of the hybrid UAV/UGV to quickly adjust for rail width, giving the user a Swiss Army Knife approach.

UAV refers to unmanned aerial vehicle while UGV refers to unmanned ground vehicle.

Figure 3:
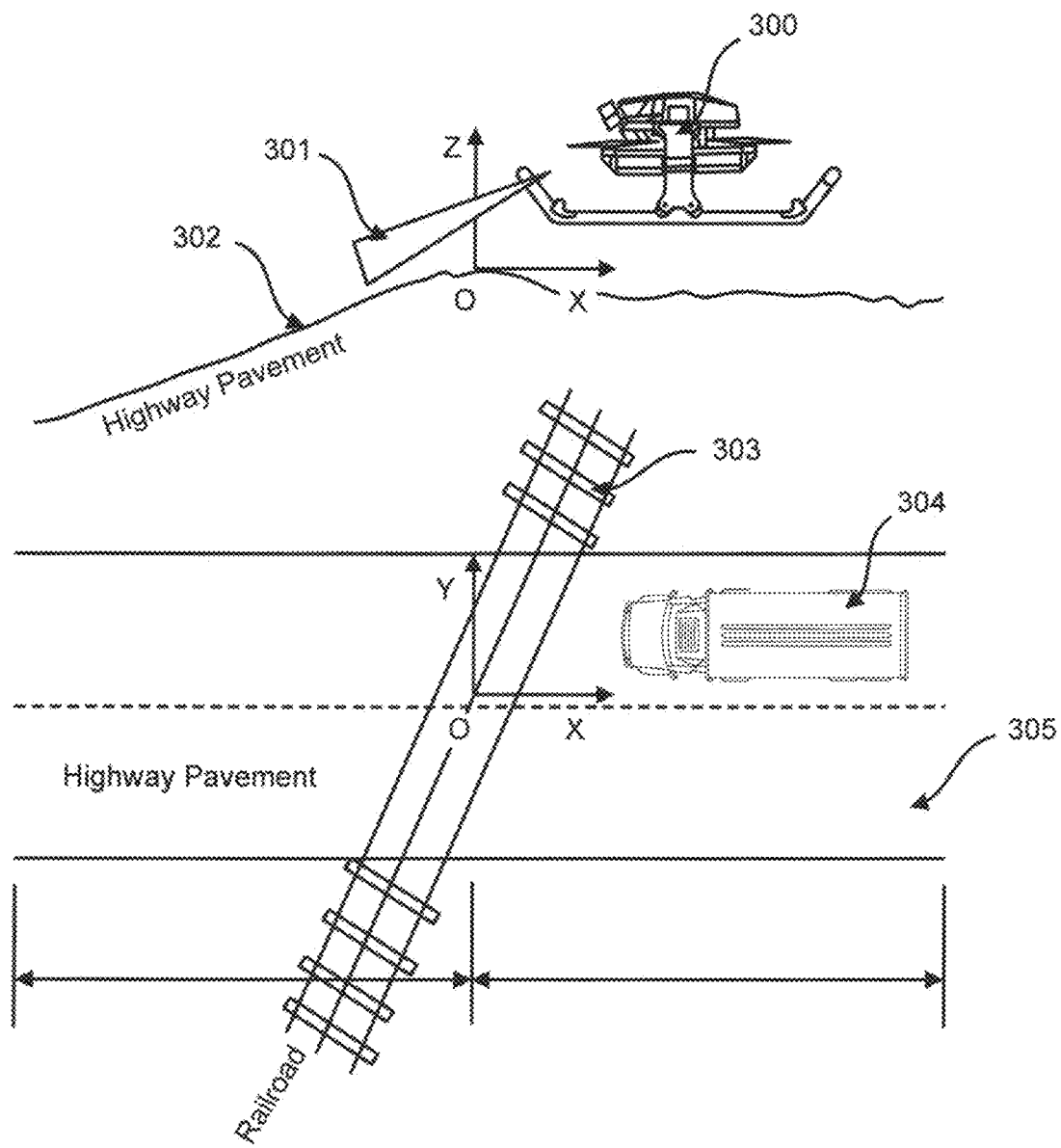
FIG. 3—The hybrid UAV/UGV surveying the hump in the railroad track using the ground mode.

The hybrid UAV/UGV in the ground mode (300) has been tested for the detection of humps (302) in railroad crossings (303) where cars and trucks (304) are travelling via a highway (305) by taking measurements by the sensors near the railroad crossings as illustrated in FIG. 3.

Figure 4:
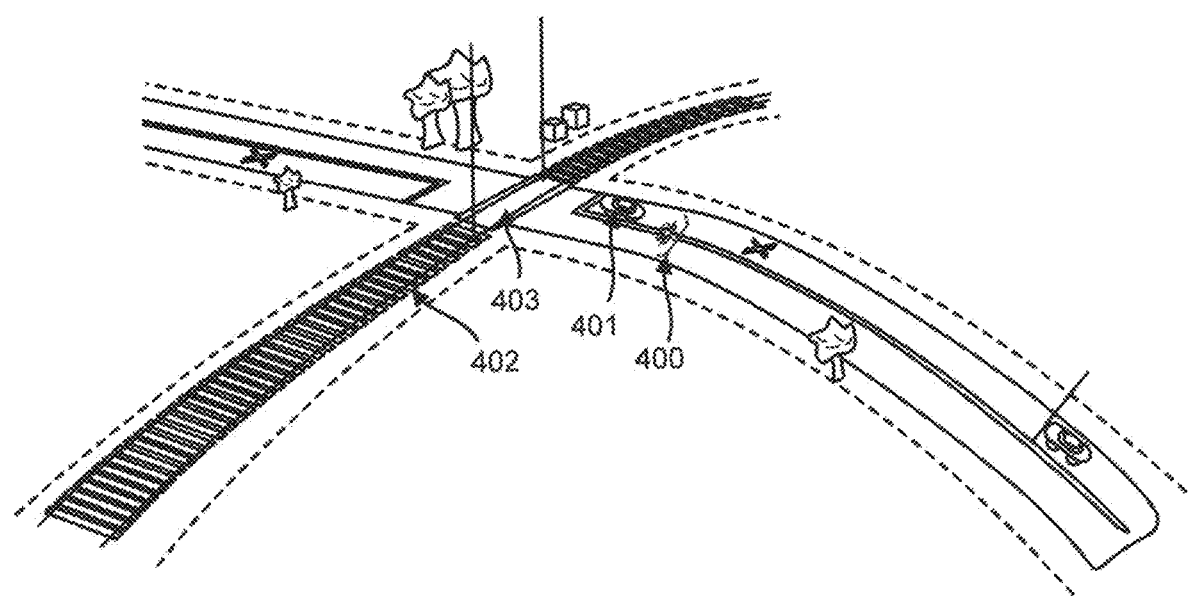
FIG. 4—The hybrid UAV/UGV surveying the visual sight lines in the railroad track using the ground mode.

The hybrid UAV/UGV in the ground mode (400) has also been tested for the detection of visual sight lines (403) in railroad crossings (402) by taking measurements near these lines as illustrated in FIG. 4. FIG. 4 shows the hybrid UAV/UGV in the ground mode near a car (401) at the visual sight line (403) near the railroad track (402).

Figure 5:
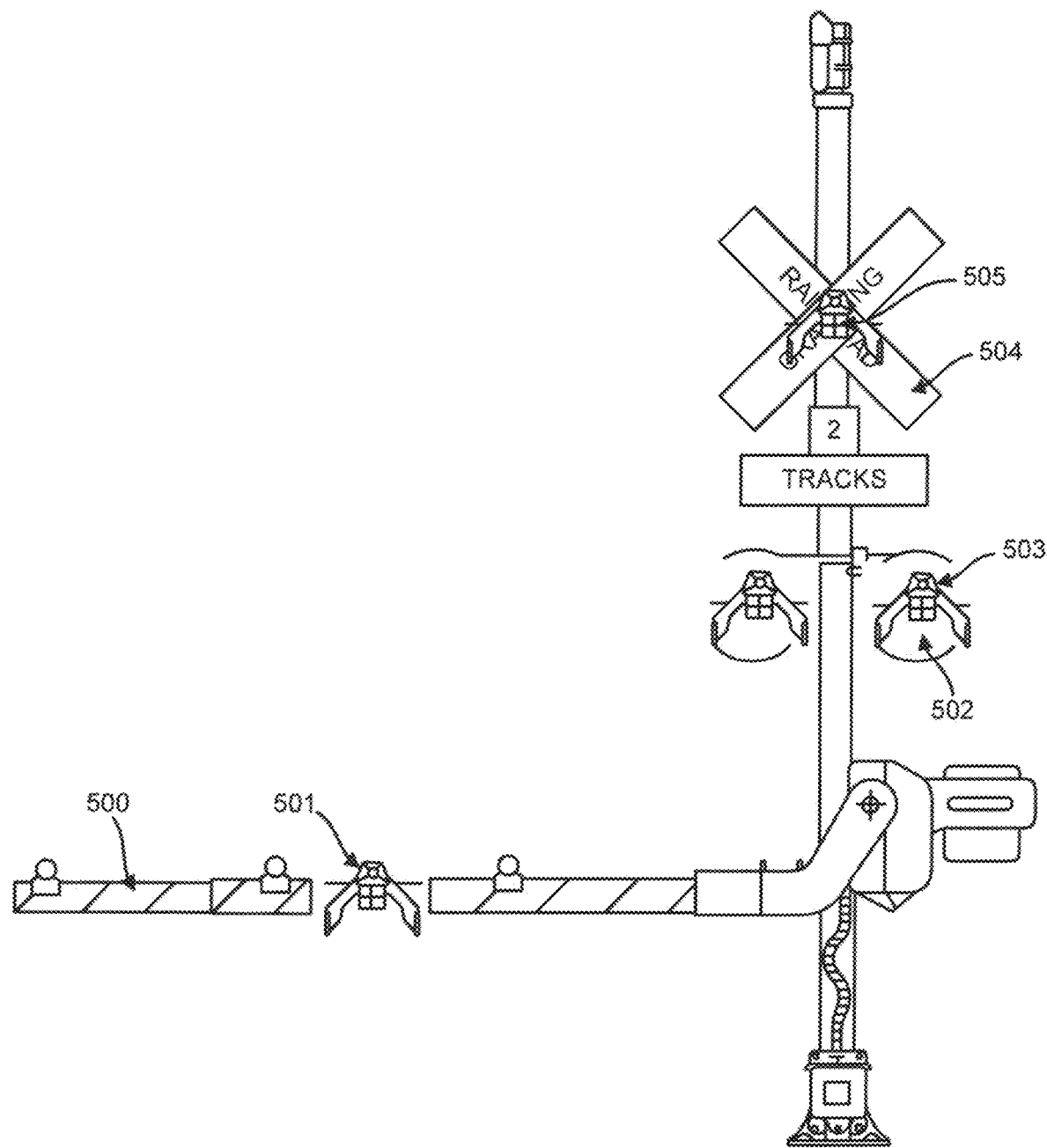
FIG. 5—The hybrid UAV/UGV surveying rail deformations in the railroad track using the ground mode.

FIG. 5 illustrates a railroad track (501) with deformations and using the hybrid UAV/UGV in the ground mode (500) to survey the railroad deformations (501).

Figure 6:
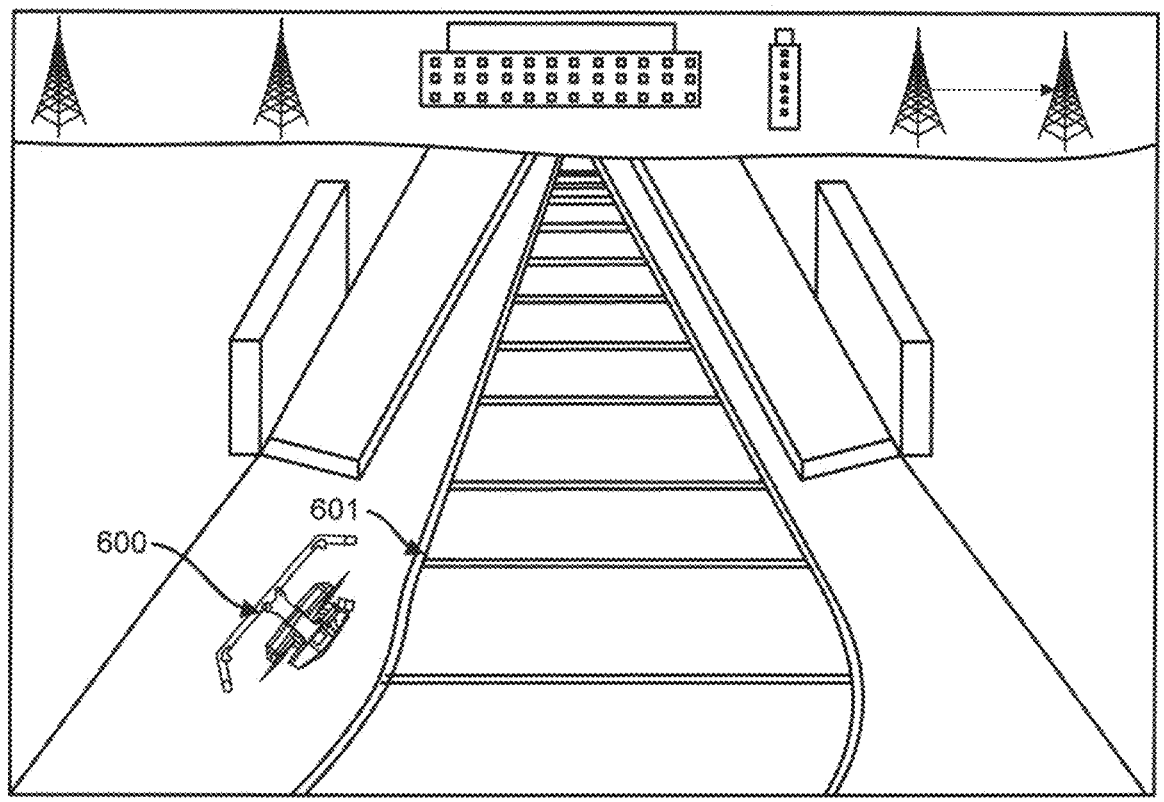
FIG. 6—The hybrid UAV/UGV surveying the lights, signs, and gates in the railroad grade crossings using the flight mode.

In addition, the hybrid UAV/UGV in flight mode (601, 603, 605) has been tested for the detection of lights, signs, and gates near railroad crossings by taking measurements at these locations using the sensors on the system as illustrated in FIG. 6.

Figure 7:
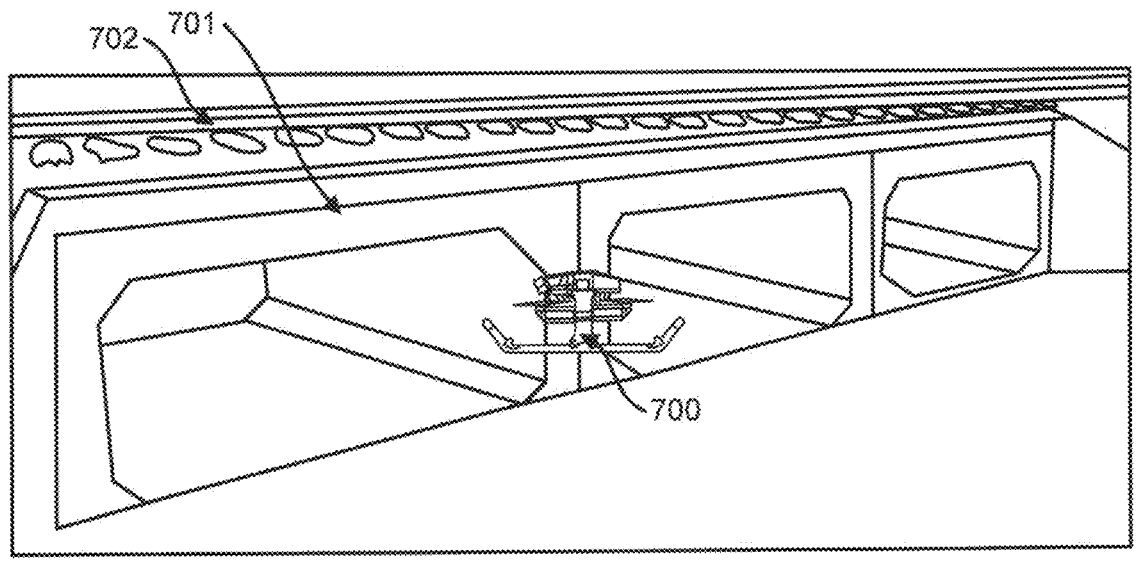
FIG. 7—The hybrid UAV/UGV surveying the culverts in the railroad crossings using the flight mode.

FIG. 7 shows the hybrid UAV/UGV (700) in the flight mode surveying the culverts (701) that are near the railroad tracks (702).

Figure 8:
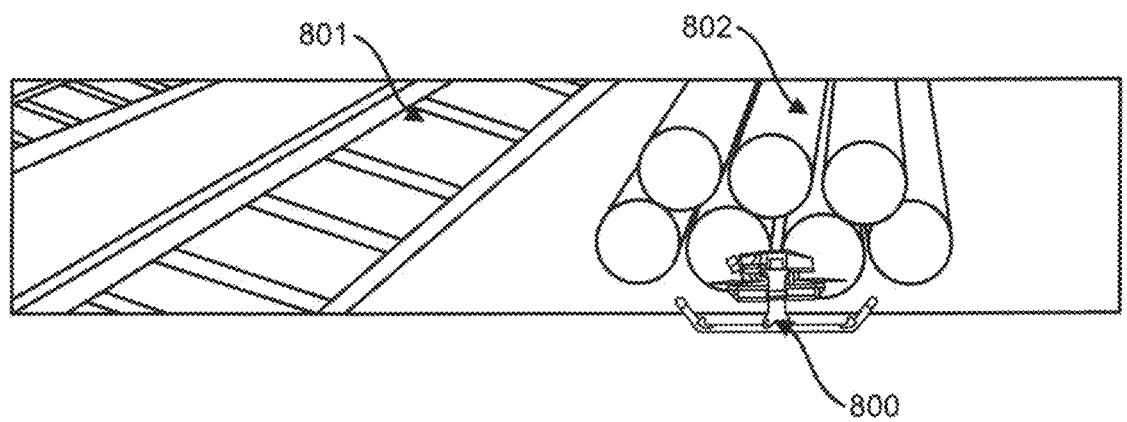
FIG. 8—The hybrid UAV/UGV surveying the drainage pipes in the railroad crossings using the flight mode.

FIG. 8 shows the hybrid UAV/UGV (800) in the flight mode surveying the drainage pipes (802) located near the railroad tracks (801).

In addition, the full functionality of the hybrid UAV/UGV has been demonstrated at railroad crossings for the simultaneous detection of humps, visual sight lines, signs, lights, grades, rail deformations, culverts, drainage pipes, and gates.

This invention pertains to a transformable robot that is capable of flying and driving for survey of humps, visual sight lines, gates, lights, grades, rail deformations, culverts, drainage pipes, or signs at railroad crossings that is comprised of a ground locomotion system, an air locomotion system, controls, and a sensor necessary to survey the humps, visual sight lines, gates, lights, grades, culverts, drainage pipes, and rail deformations.

Hump crossings which are also referred to as high-profile crossings are a highway/rail intersection in which the road surface profile across the rail tracks may pose a risk to a low-clearance vehicle becoming stuck on the tracks. The hump crossings may also pose a threat to heavy vehicles that are required to stop at the crossings due to the steep grades.

Grade crossing signals are electronic warning devices that are used for road vehicles at railroad grade crossings. These signals consist of flashing red lights, a crossbuck and a bell attached to a mast. At most crossings, the signals will activate about 30 seconds before the train arrives.

Culverts are structures that allow water to flow under a road, railroad, trail, or similar obstruction from one side to the other side.

Railroad crossings have many different rail deformations due to a severe load environment leading to damage and degradation of rail profiles. This damage and deformation is the result of high magnitudes of contact pressure and slip generated in the wheel-rail contacts during each wheel transition between the wing rail and crossing nose.

A highway-railroad grade crossing is an intersection where a roadway crosses railroad tracks at the same level.

In this system, the transformable robot is designed to detect a variety of different safety related conditions in railroad crossings.

The sensor that is used in the transformable robotic system can be LADAR, RADAR, acoustic sensor, ranging radios, GPS, or RTK GPS.

LADAR stands for Light Detecting and Ranging Systems and this type of sensor uses light to determine the distance to an object. The advantage of LADAR over RADAR (radio detecting and ranging system) is that LADAR can also image the target at the same time as well as determining the distance. This gives a 3D view of the object in question. It involves illuminating the target with laser light and measuring the reflected light with a sensor. Differences in laser return times and wavelengths can then be used to make digital 3-D representations of the target.

RADAR refers to radio detecting and ranging systems and is a system for detecting the presence, direction, distance, and speed of aircraft, ships, and other objects by sending out pulses of high-frequency electromagnetic waves that are reflected off the object back to the source.

Acoustic sensors have a detection mechanism that is a mechanical or acoustic wave. Piezoelectric acoustic wave sensors apply an oscillating electric field to create a mechanical wave, which propagates through the substrate and is then converted back to an electric field for measurement purposes.

GPS refers to global positioning system and The Global Positioning System (GPS) is a satellite-based navigation system made up of at least 24 satellites. GPS works in any weather conditions, anywhere in the world, 24 hours a day, with no subscription fees or setup charges. The U.S. Department of Defense (USDOD) originally put the satellites into orbit for military use, but they were made available for civilian use in the 1980s. The global positioning system works by circling the Earth twice a day in a precise orbit. Each satellite in the global positioning system transmits a unique signal and orbital parameters that allow these devices to decode and compute the precise location of the satellite. GPS receivers use this information and trilateration to calculate a user's exact location. Overall, the GPS receiver measures the distance to each satellite by the amount of time it takes to receive a transmitted signal.

RTK GPS refers to real-time kinematic global positioning system. It is a technique that uses carrier-based ranging and provides ranges (and therefore positions) that are orders of magnitude more precise than those available through code-based positioning.

The transformable robot has a ground modality that can be used to detect humps, grade crossings, visual sight lights, drainage pipes, or culverts.

The transformable robot has a flight modality that can be used for the detection of lights, signs, or gates.

The transformable robot has a hybrid system that can be used to go over the gates, lights, or signs at the railroad crossings and can perch and stare at the signs, lights, or gates at the railroad crossings.

A map is created by using the sensor data obtained on the transformable robot. The features such as culverts, humps, rail deformations, grade crossings, and drainage pipes are marked in the map.

Also in this transformable robot, there is a database that stores historical information of these features from one point to the next (change detection).

The transformable robot can also take samples of the soil and debris that are found in the ground near the railroad crossings using its ground modality.

The invention claimed is:

1. A hybrid unmanned aerial vehicle (UAV)/unmanned ground vehicle (UGV) comprising:
    a ground locomotion system;
    an air locomotion system;
    controls; and
    a sensor,
        wherein the hybrid UAV/UGV is programmed to utilize the ground locomotion system to drive along a roadway across an at-grade railroad crossing and utilize the sensor to capture and store data descriptive of a ground surface profile of the roadway across the railroad crossing.

2. The hybrid UAV/UGV of claim 1, wherein the hybrid UAV/UGV is programmed to detect a variety of safety-related conditions at the railroad crossing.

3. The hybrid UAV/UGV of claim 1, wherein the sensor comprises at least one of LADAR, RADAR, acoustic sensor, ranging radios, GPS, or RTK GPS.

4. The hybrid UAV/UGV of claim 1, wherein the ground modality is engaged by activating hinges of the hybrid UAV/UGV.

5. The hybrid UAV/UGV of claim 1, wherein the hybrid UAV/UGV is programmed to utilize the air locomotion system to capture and store data descriptive of lights, signs, or gates.

6. A drone-based grade crossing inspection system, comprising:
    a hybrid unmanned aerial vehicle (UAV)/unmanned ground vehicle (UGV) comprising:
    (i) an air locomotion system operable to move the UAV/UGV in a flight mode;
    (ii) a ground locomotion system operable to move the UAV/UGV in a drive mode;
    (iii) an electronic processing device;
    (iv) a sensor device;
    (v) batteries coupled to provide power to each of the air locomotion system the ground locomotion system operable, the electronic processing device and the spinning LADAR device; and
    (vi) a data storage device storing instructions that when executed by the electronic processing device, result in:
        navigating, utilizing the flight mode, to an at-grade railroad crossing;
        capturing, utilizing the sensor device and while in the flight mode, data descriptive of at least one of lights, signs, gates, culverts, and drainage pipes at the railroad crossing;
        transforming from flight mode to drive mode and traveling along a roadway across the railroad crossing;
        capturing, utilizing the sensor device and while in the ground mode during the traversing, data descriptive of at least one of a visual sight line and a road surface profile at the railroad crossing; and
        storing, in the data storage device, the captured data.

7. The drone-based grade crossing inspection system of claim 6, wherein the sensor comprises a spinning LADAR device.

8. The drone-based grade crossing inspection system of claim 6, wherein the sensor comprises an electro-optical (EO) camera.

9. The drone-based grade crossing inspection system of claim 8, wherein the camera comprises an EO/IR gimbal camera.

10. The drone-based grade crossing inspection system of claim 8, wherein the camera comprises each of a forward pointing camera and a backward pointing camera.

11. The drone-based grade crossing inspection system of claim 6, wherein the ground locomotion system is coupled to the UAV/UGV via hinges and is operable to pivot about the hinges to switch between an engaged mode and a mode where the ground locomotion system is lifted to provide propeller protection for the air locomotion system.

12. The drone-based grade crossing inspection system of claim 6, wherein the ground locomotion system is coupled to the UAV/UGV via hinges and is operable to vary a width between ground engaging drive implements of the ground locomotion system.

13. The drone-based grade crossing inspection system of claim 6, wherein the ground locomotion system comprises at least two tracks.

* * * * *